(No Model.)

J. L. HUBER.
GEARING.

No. 418,516. Patented Dec. 31, 1889.

2 Sheets—Sheet 1.

Witnesses,
Walter Scott.
Julius Lottman

Inventor.
Joseph Leopold Huber,
By Paine & Lord
attys.

(No Model.) 2 Sheets—Sheet 2.
J. L. HUBER.
GEARING.

No. 418,516. Patented Dec. 31, 1889.

Witnesses. Inventor.
Walter Scott. Joseph Leopold Huber.
By Paine Ladd
attys.

UNITED STATES PATENT OFFICE.

JOSEPH LEOPOLD HUBER, OF HAMBURG, GERMANY.

GEARING.

SPECIFICATION forming part of Letters Patent No. 418,516, dated December 31, 1889.

Application filed August 30, 1889. Serial No. 322,411. (No model.)

*To all whom it may concern:*

Be it known that I, JOSEPH LEOPOLD HUBER, a subject of the German Emperor, and a resident of Hamburg, in the German Empire, have invented certain new and useful Improvements in Gearing, of which the following is a specification.

My invention relates to shaft-couplings, and the object of the same is to provide means for connecting shafts so as to drive machinery with a varying expenditure of power by increasing or decreasing the speed in the transmission. I attain this object by the mechanism illustrated in the accompanying drawings, in which—

Figure 1:
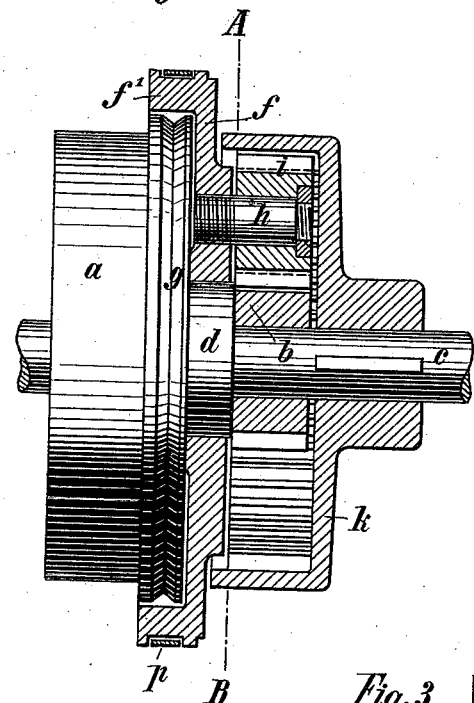
Figure 2:
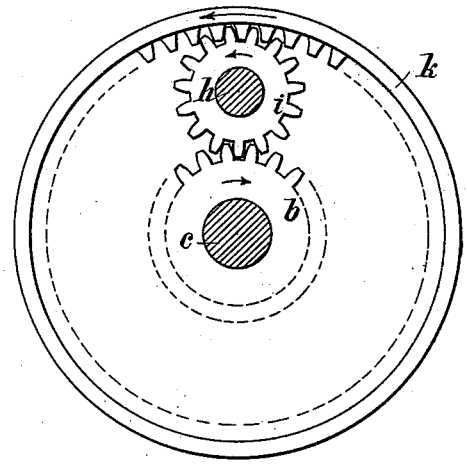
Figure 3:
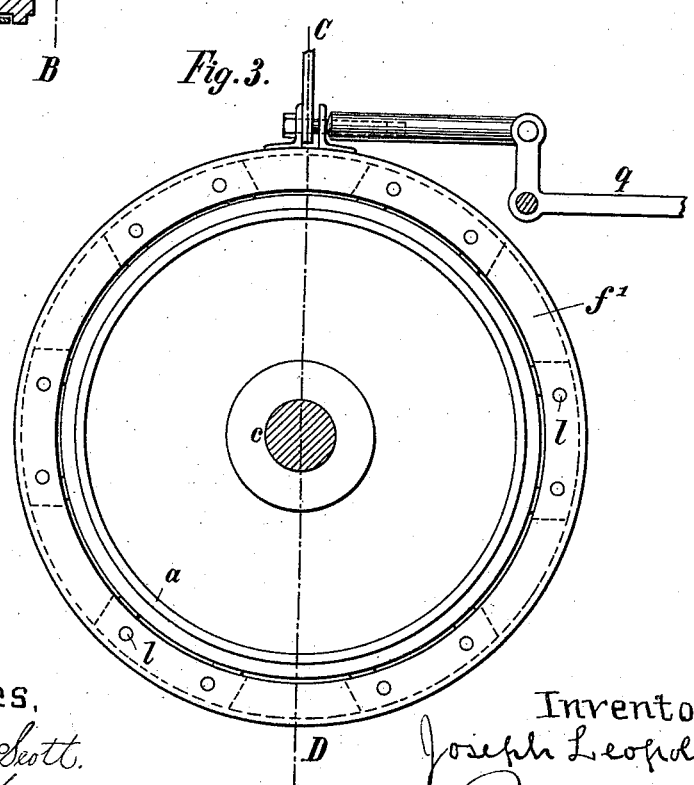
Figure 4:
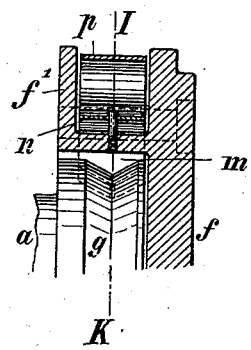
Figure 5:
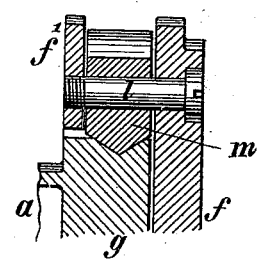
Figure 6:
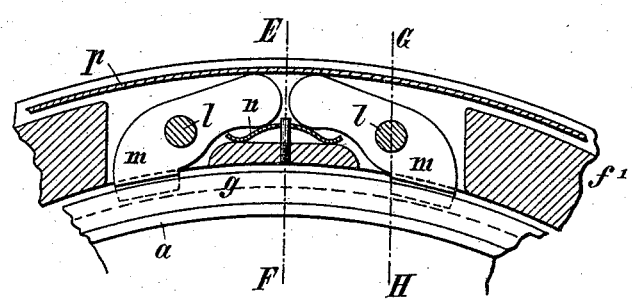
Figure 7:
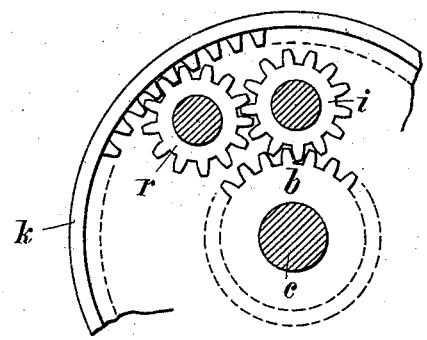

Figure 1 is a side view of said coupling, partly in vertical section, after the line C D of Fig. 3; Fig. 2, a section after the line A B of Fig. 1; Fig. 3, a front view of my improved coupling; Fig. 4, a detailed side view, partly in section, after the line E F of a part of the coupling; Fig. 5, a section of the same after the line G H of Fig. 6, which shows a section after the line I K of Fig. 4; and Fig. 7 a modification of Fig. 2.

Similar letters refer to similar parts throughout the several views.

My said apparatus comprises a belt-pulley $a$, or other equivalent driving mechanism, which is firmly connected with a toothed wheel $b$, and is adapted to turn with the latter loosely upon its shaft $c$. Upon the nave $d$ of this pulley is movably arranged a brake-pulley $f$, which is provided with a rim $f'$, extending over a grooved collar $g$ on the said belt-pulley $a$, and which has a pin $h$, carrying a small spur-wheel $i$. The teeth of this wheel $i$ are simultaneously in gear with the internal teeth of a wheel $k$, which is fixed upon its shaft $c$, and with the teeth of the wheel $b$, connected to the band-pulley. In suitable openings formed in the aforesaid rim $f'$ of the brake-pulley $f$ are provided brake claws or pawls $m$ $m$, which are pivoted on pins $l$. The inner arms of these claws or pawls $m$ are pressed into the above-mentioned grooved collar $g$ on the driven pulley under the action of springs $n$ $n$, whereas the outer arms of the claws or pawls $m$ project from the said brake-pulley $f f'$ and come in contact with the brake-blocks or the brake-band $p$. As long as the brake-band is not applied the above-mentioned belt-pulley $a$ and brake-pulley $f$ are coupled together, because in the turning movement of the same in one or the other direction one or the other of the brake claws or pawls, being pivoted eccentrically, will be pressed into the groove in the aforesaid collar $g$ with a power that is proportional to the resistance. This arrangement enables the wheel $b$, secured to the belt-pulley $a$, to be firmly coupled to the wheel $i$, carried by the pin $h$ on the said brake-pulley $f$, the latter wheel being prevented by the former from turning. The wheel $k$, having internal teeth, is consequently also fixed relatively to the wheel $i$ on the pin $h$ of the brake-pulley $f$, and is therefore carried away at the full speed of the aforesaid belt-pulley $a$. If now by means of a bell-crank lever $q$ or the like the said brake-band $p$ is applied against the brake-pulley $f f'$, this pulley will be fixed while the grooved collar $g$ on the belt-pulley $a$ is liberated from the brake claws or pawls $m$, because the brake-band will cause the arm protruding from the periphery of the pulley $f$ to move into the interior of the rim $f'$, and the opposite arm is raised from the grooved collar $g$ of the belt-pulley $a$. The rotary movement of the said belt-pulley $a$ is now transmitted by the toothed wheel $b$, connected therewith, to the wheel $i$, adapted to turn upon the pin $h$ on the brake-pulley $f$, which pin $h$ is now fixed together with the band-pulley $f$, and then to the internally-toothed wheel $k$ and its shaft $c$ at a speed which must be in proportion to the diameter of the pitch-circles of the wheel $b$, connected with the belt-pulley $a$, and that of the said internally-toothed wheel $k$. This movement, which is thus transmitted to the latter wheel through the medium of a single intermediate wheel $i$, takes place in the opposite direction to that of the said belt-pulley $a$. If, therefore, the latter and the internally-toothed wheel are to revolve in the same direction, the movement of the wheel $i$, carried by the pin $h$, on the brake-pulley $f$ must not be transmitted directly, as it is necessary to include a second intermediate wheel $r$, Fig. 7. Instead of at one point, the power can of course be transmitted from the toothed wheel $b$, connected with the belt-pulley $a$, at several points, and on this depends the number of the intermediate wheels or pairs of wheels, or in lieu of toothed wheels use can be made of friction-pulleys, and the belt-pulley can be keyed upon the shaft, while the internally-toothed wheel can be arranged to turn upon its shaft. The part which receives the power or is driven need not necessarily be placed upon the same or a coaxial shaft as the driving part—for example, the driven wheel may be arranged upon a shaft which is parallel to that on which the belt-pulley is placed, and may engage by means of external teeth with one of the intermediate wheels without departing from the nature of this invention.

Having now particularly described and ascertained the nature of my said invention and in what manner the same is to be performed, I declare that what I claim is—

1. As an improvement in gearing, the pulley herein described, provided with a grooved portion, and the brake-pulley having brake claws or pawls for effecting a connection or contact with said grooved portion, substantially as set forth.

2. As an improvement in gearing, the pulley herein described, provided with a grooved portion, the brake-pulley having brake claws or pawls engaging said grooved portion, and the brake-band encircling said brake-pulley for operating said claws or pawls, substantially as set forth.

3. As an improvement in gearing, the pulley herein described, provided with a grooved portion, the brake-pulley having brake claws or pawls pivotally secured therein and engaging said grooved portion, the spring bearing against said claws or pawls, and the brake-band for operating the latter, substantially as set forth.

4. As an improvement in gearing, the pulley herein described, loose upon its shaft and having a gear-wheel connected thereto, also loose upon said shaft, the brake-wheel having contact with said pulley, the wheel $k$, fast on said shaft, and the wheel-connection between said gear-wheel $k$ and the gear-wheel $b$, substantially as set forth.

5. As an improvement in gearing, the pulley herein described, loose upon its shaft and having a gear-wheel connected thereto, also loose upon said shaft, the brake-wheel having contact with said pulley, the gear-wheel $i$, secured to said brake-wheel, and the wheel $k$, fast on said shaft and provided with internal teeth engaging said latter gear-wheel, substantially as set forth.

6. The herein-described improvement in gearing, comprising the pulley loose on its shaft and provided with a grooved portion, the brake-wheel having spring-held claws or pawls engaging said grooved portion, the brake-band for operating said claws or pawls, the gear-wheel $b$, secured to said pulley and also loose upon said shaft, the gear-wheel $i$, secured to said brake-wheel, and the internally-toothed wheel $k$, fast on said shaft, substantially as set forth.

In testimony that I claim the foregoing as my invention I have signed my name, in presence of two witnesses, this 20th day of July, 1889.

JOSEPH LEOPOLD HUBER.

Witnesses:
  J. CUÉNOD,
    10 *Rue Voltair, Genéve.*
  ED CUÉNOD,
    289 *Route de Lyon, Genéve.*